US009499177B2

(12) United States Patent
Wade et al.

(10) Patent No.: US 9,499,177 B2
(45) Date of Patent: Nov. 22, 2016

(54) SYSTEM AND METHOD OF MODIFYING THE FRICTION OF RAILROAD TRACKS

(71) Applicants: John A. Wade, Lenexa, KS (US); Thomas L. Jennings, Overland Park, KS (US); Donald E. Norris, Kansas City, KS (US)

(72) Inventors: John A. Wade, Lenexa, KS (US); Thomas L. Jennings, Overland Park, KS (US); Donald E. Norris, Kansas City, KS (US)

( * ) Notice: Subject to any disclaimer, the term of this patent is extended or adjusted under 35 U.S.C. 154(b) by 100 days.

(21) Appl. No.: 14/469,021

(22) Filed: Aug. 26, 2014

(65) Prior Publication Data
US 2015/0054292 A1 Feb. 26, 2015

Related U.S. Application Data

(60) Provisional application No. 61/870,022, filed on Aug. 26, 2013.

(51) Int. Cl.
*B61C 15/10* (2006.01)
*E01B 19/00* (2006.01)

(52) U.S. Cl.
CPC .............. *B61C 15/10* (2013.01); *E01B 19/003* (2013.01); *Y02T 30/40* (2013.01)

(58) Field of Classification Search
CPC ..... B60B 39/00; B60B 39/02; B60B 39/021; B60B 39/022
USPC ............................ 291/2, 3, 6, 12, 13, 22–24
See application file for complete search history.

(56) References Cited

U.S. PATENT DOCUMENTS

| 7,784,840 B2 * | 8/2010 | Leslie | B61K 3/00 291/3 |
|---|---|---|---|
| 2010/0300810 A1 | 12/2010 | Singleton et al. | |
| 2010/0330664 A1 * | 12/2010 | Liberman | A01N 1/0263 435/307.1 |

OTHER PUBLICATIONS

Rail fastening system; Wikipedia; Printed Date: Dec. 8, 2014; Date Posted: Unknown; <http://en.wikipedia.org/wiki/Rail_fastening_system>.
L.B. Foster Rail Technologies; Printed Date: Dec. 8, 2014; Posted Date: Unknown; <http://www.lbfoster-railtechnologies.com>.
Lubrication for the Railroad Industry; Lincoln; Printed Date: Dec. 8, 2014; Posted Date: Unknown; <http://www.lincolnindustrial.com/products/automaticlubrication/railroadlubrication.aspx>.

* cited by examiner

*Primary Examiner* — R. J. McCarry, Jr.
(74) *Attorney, Agent, or Firm* — Erise IP, P.A.

(57) ABSTRACT

A railroad friction-modification system for applying a friction modifier to a section of railroad track, the system comprising an external storage tank for storing the friction modifier, a railroad friction-modification assembly for applying the friction modifier, a tube for connecting the external storage tank to the railroad friction-modification assembly, and a mounting assembly for securing the railroad friction-modification assembly to the rail. The railroad friction-modification assembly includes an expandable membrane for storing the friction modifier, an inlet valve for receiving the friction modifier from the external storage tank, a housing for securely containing the expandable membrane, at least one outlet valve for expelling the friction modifier from the expandable membrane upon the application of a force, and a nozzle for directing the expelled friction modifier onto the section of railroad track. The force is applied by the wheel of a railroad car, such that the railroad friction-modification assembly pumps the friction modifier in a peristaltic action.

20 Claims, 9 Drawing Sheets

SYSTEM AND METHOD OF MODIFYING THE FRICTION OF RAILROAD TRACKS

RELATED APPLICATIONS

This application claims priority benefit, with respect to all common subject matter, of U.S. Provisional Patent Application No. 61/870,022, filed Aug. 26, 2013, and entitled "RAILROAD TRACK LUBRICATION SYSTEM" (the '022 Provisional Application). The disclosure of the '022 Provisional Application is hereby incorporated herein by reference in its entirety.

BACKGROUND

Field

Embodiments of the invention relate to the modification of the friction of railroad tracks. More particularly, embodiments of the invention relate to an assembly, a system, and a method for applying a friction modifier to a section of a railroad track.

Related Art

Railroad tracks require friction modification for safe and efficient operation of the locomotives and railroad cars that move over them. Therefore, railroad operators periodically apply friction modifiers to the railroad tracks. The friction modifier reduces wear on the track, reduces wear on the wheels, reduces noise, and increases fuel economy.

Common friction modification systems include a tank for storing the friction modifier, an applicator adjacent to a section of railroad track, a line that connects the tank to an applicator, and an electrically powered pump.

There are several drawbacks to the friction modification systems in the prior art. First, they rely on the wheels of passing railroad cars to distribute the friction modifier onto the rail. Railroad friction modification systems of the prior art provide grease onto a porous substance that a passing wheel will impact and absorb a portion thereof. These railroad friction modification systems do not provide a predictable and consistent amount of grease to the railroad track. The grease tends to sink to the bottom of the porous substance, leak out, etc.

The second drawback of friction modification systems of the prior art is that they are prone to failure due to clogging with sand, mud, dirt, grease, metal shards, rocks, etc. These foreign items are pressed into the openings by the passing wheels. The electric pump is too far away and too weak to overcome the clogs. Over time and in the heat and cold, the friction modifier can separate and solidify. As such, friction modification systems must be periodically cleaned, repaired, and replaced.

The third drawback of the friction modification systems of the prior art is that they tend to waste the friction modifier. By not placing the friction modifier directly atop the rail, the friction modification systems allow friction modifier to drip and fall onto the ground.

The fourth drawback of the friction modification systems of the prior art is that the porous substance collects dirt, dust, water, and other substances of the harsh environment near a railroad track. These substances mix with the grease and modify its properties to produce undesirable results.

SUMMARY

Embodiments of the invention solve the above-mentioned problems by using a peristaltic action that utilizes the force of passing trains to pump the friction modifier directly onto a rail. The force of the peristaltic action reduces clogging by generating pressure directly behind a nozzle. The invention therefore issues a precise amount of friction modifier that is dependent on the traffic on the section of railroad track. The invention utilizes an electric pump to inflate an enclosed membrane with friction modifier to a certain pressure. This allows the passing wheels to compress the enclosed membrane and force the friction modifier through a nozzle onto the rail. The enclosed membrane provides a greater force to place the friction modifier onto the rail, instead of relying on the wheel to pick up and distribute the friction modifier.

A railroad friction modification system in accordance with a first embodiment of the invention comprises a railroad friction modification assembly, an external storage tank with a pump, a tube for connecting the railroad friction modification assembly to the external storage tank, and a mounting assembly for mounting the railroad friction modification assembly onto or adjacent to a rail of the section of railroad track. Some embodiments of the system further comprise a second railroad friction modification assembly that is substantially similar to the railroad friction modification assembly for mounting on an opposing rail of the section of railroad track. Other embodiments of the system further comprise the second railroad friction modification assembly that is passive, such that it receives and applies expelled friction modifier from the railroad friction modification assembly.

A railroad friction modification assembly in accordance with a second embodiment of the invention comprises an expandable membrane for storing the friction modifier within the railroad friction modification assembly, an inlet valve for receiving the friction modifier from the external storage tank, a housing for securely containing the expandable membrane, at least one outlet valve for expelling the friction modifier, and a nozzle for directing the friction modifier onto the section of railroad track. Some embodiments of the railroad friction modification assembly further comprise an abrasion-resistant flexible sheet that is secured over the housing to prevent abrasion to and over-inflation of the expandable membrane.

A method of modifying the friction of railroad tracks in accordance with a third embodiment of the invention comprises the following steps: installing the external storage tank for storing the friction modifier near the rail; installing the mounting assembly adjacent to the rail; securing the railroad friction modification assembly to the mounting assembly; installing the tube connecting the external storage tank to the inlet valve of the railroad friction modification assembly; and filling the external storage tank with the friction modifier. Other embodiments of the method may further comprise the steps of determining an optimal amount of friction modification, and adjusting the amount of friction modification deposited on the rail to be approximately equal to the optimal amount of friction modification.

Still other embodiments of the invention can be utilized for other applications. Some embodiments of the invention are directed to the friction modification of transportation systems such as gondola lifts, cable cars, light rail, trams, streetcars, monorails, tracked vehicles, roadways, and bridges. Other embodiments of the invention are directed to the friction modification of machinery, such as assembly lines, robotics, roller coasters, and manufacturing equipment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

Figure 1:
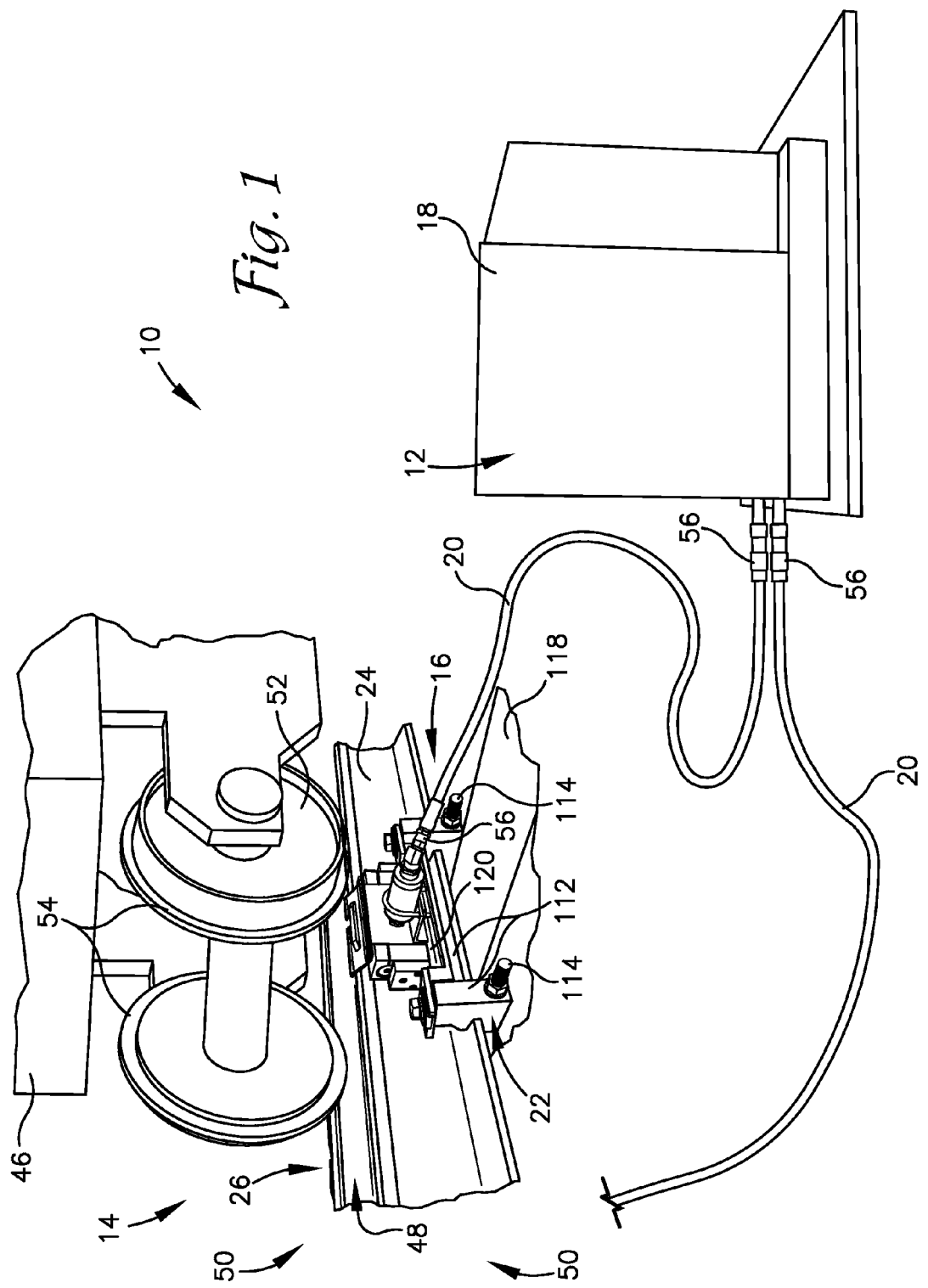
FIG. 1 is an environmental view one embodiment of the railroad friction modification system, in which the railroad friction modification assemblies are installed on the field side of the respective rails.
Figure 2:
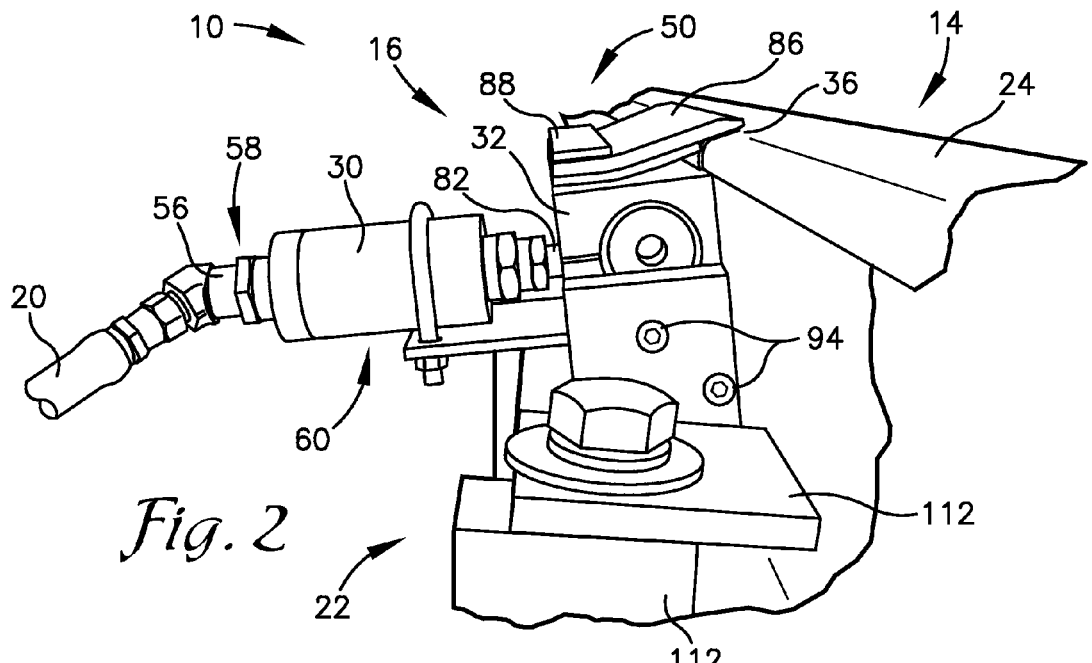
FIG. 2 is a fragmentary perspective view of the railroad friction modification assembly secured to the rail.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the invention can include a variety of combinations and/or integrations of the embodiments described herein.

Figure 9:
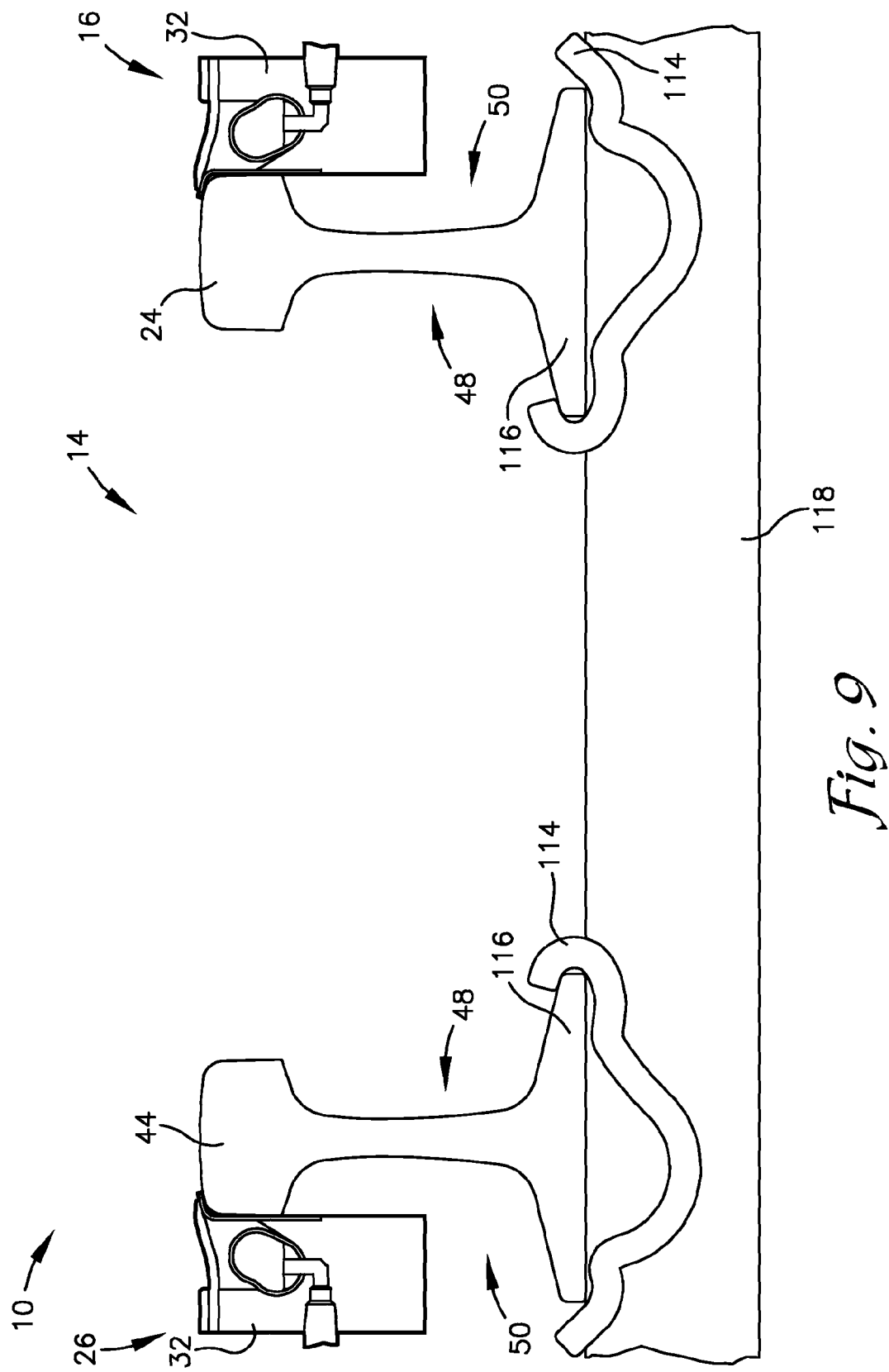
FIG. 9 is a vertical cross-section view of yet another embodiment of the invention, illustrating a section of railroad track having two railroad friction modification assemblies each installed on the field side of the respective rails.

Embodiments of the invention are directed to a railroad friction-modification system 10 for applying a friction modifier 12 to a section of railroad track 14. As illustrated in FIG. 1, the system 10 comprises a railroad friction-modification assembly 16, an external storage tank 18 that has an associated pump (not illustrated), a tube 20 for connecting the railroad friction-modification assembly 16 to the external storage tank 18, and a mounting assembly 22 for mounting the railroad friction-modification assembly 16 onto or adjacent to a rail 24 of the section of railroad track 14. Some embodiments of the system, as illustrated in FIG. 9, further comprise a second railroad friction-modification assembly 26 that is substantially similar to the railroad friction-modification assembly 16 for mounting on an opposing rail 44 of the section of railroad track 14. Other embodiments of the system further comprise the second railroad friction-modification assembly 26 wherein the second railroad friction-modification assembly 26 is passive, such that it receives and applies expelled friction modifier 12 from the railroad friction-modification assembly 16.

Figure 10:
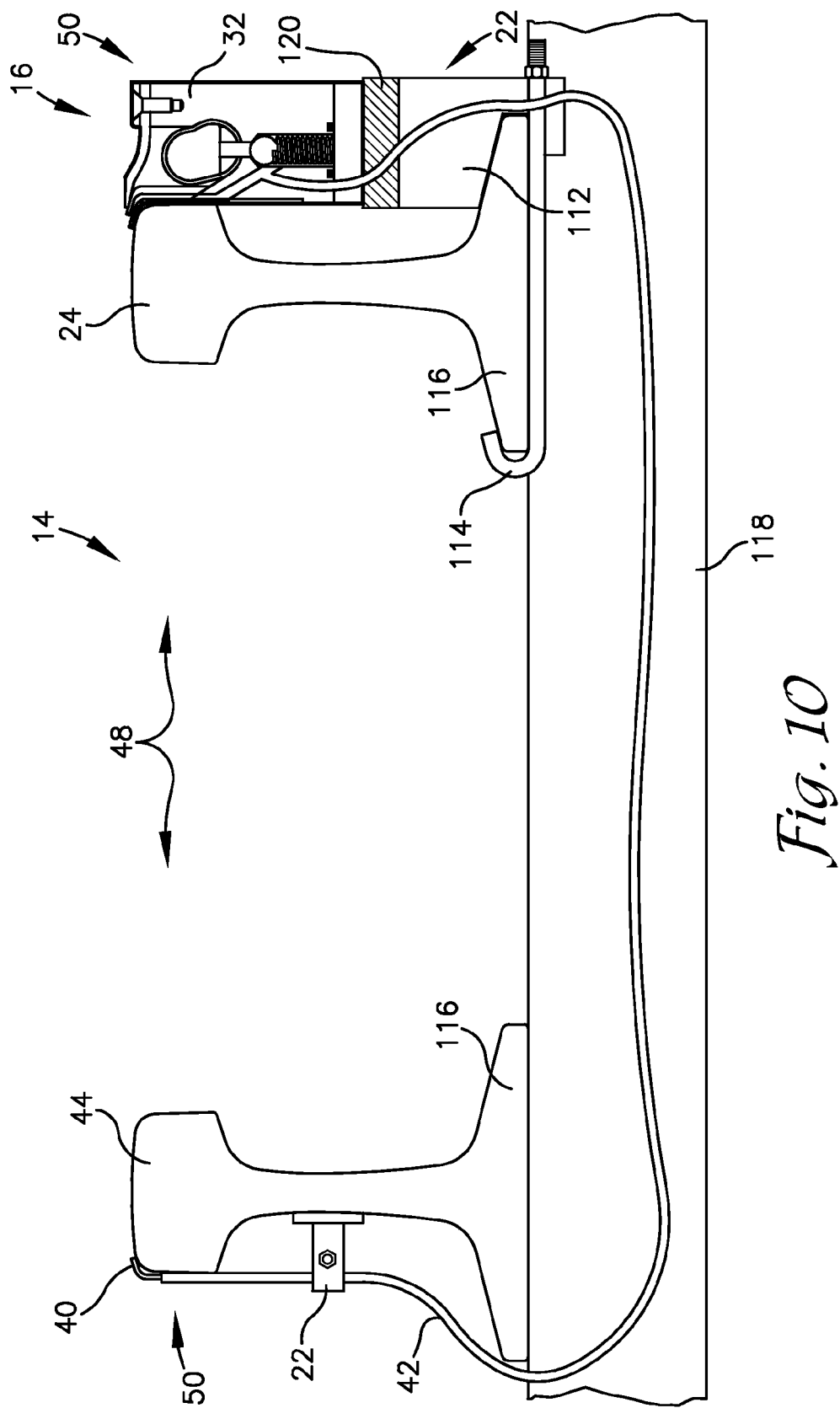
FIG. 10 is a vertical cross-section view of yet a further embodiment of the invention, illustrating a secondary tube and a secondary nozzle applying friction modifier to an opposing rail.

As illustrated in FIGS. 2-8, embodiments of the invention are directed to the railroad friction-modification assembly 16. The railroad friction-modification assembly 16 comprises an expandable membrane 28 for storing the friction modifier 12 within the railroad friction-modification assembly 16, an inlet valve 30 for receiving the friction modifier 12 from the external storage tank 18, a housing 32 for securely containing the expandable membrane 28, at least one outlet valve 34 for expelling the friction modifier 12, and a nozzle 36 for directing the friction modifier 12 onto the section of railroad track 14. Some embodiments of the railroad friction-modification assembly 16 further comprise a flexible sheet 38 that is secured over the housing 32 to prevent abrasion to and over-inflation of the expandable membrane 28. Other embodiments of the railroad friction-modification assembly 16, as illustrated in FIG. 10, comprise a secondary nozzle 40 and a secondary tube 42 for applying friction-modification to the opposing rail 44 of the section of railroad track 14.

Railroad tracks support and guide a railroad car 46. The section of railroad track 14 comprises a pair of rails 24 running substantially parallel to each other. Typically in the industry, the side of the rail 24 which faces inward (toward the opposing rail 44) is referred to as a gauge side 48. The side of the rail 24 which faces outward (away from the opposing rail 44) is referred to as a field side 50.

Railroad cars 46 run atop the railroad tracks. Locomotives provide the power that moves the railroad cars 46 attached thereto. Typically, the railroad cars 46 are passive. A plurality of wheels 52 on the locomotives and the railroad cars 46 interface with the railroad track. Typically, the wheels 52 have a flange 54 that extends downward from the wheel 52 on the gauge side 48. The flange 54 prevents the wheel 52 from moving laterally off the tracks. Since there is a flange 54 on the respective gauge sides 48 of the rails 24, the railroad car 46 is kept securely on the railroad track. Each wheel 52 presents a circumference, and the flange 54 of the wheel 52 presents a circumference that is larger than the circumference of the wheel 52.

In order to ensure efficient and continued operation, friction modifier 12 must be applied periodically to either or both of the railroad tracks and/or the wheel 52 of the railroad car 46. Improper or inadequate friction modification can lead to replacing rails, grinding them back into proper shape, replacing wheels, increasing fuel costs, increasing noise, and even train derailments. Frication modification is especially important near and around curves in the track where there is a large amount of friction due to lateral forces.

"Friction modifier" and "friction modification," as discussed herein, refers to modifying the coefficient of friction between the surface of the rail 24 and the surface of the wheel 52 to bring it close or to a desired coefficient of friction. Having a coefficient of friction that is too low causes wheel slippage and increases the distance needed to stop. Having a coefficient of friction that is too high increases wheel and rail wear, increases noise, and can even cause derailment. The modification is achieved by the application of a friction modifier 12. The friction modifier 12 is typically a liquid, but could also be a granular solid or a mixture thereof. Typically the friction modifier 12 will lubricate, i.e. reduce the coefficient of friction between the surfaces. However, in certain circumstances the friction modifier 12 will increase the coefficient of friction, such as on steep inclines. The coefficient of friction between the two surfaces is usually in a range of 0.1 to 0.8. The coefficient of friction differs over the surfaces though, such that the coefficient of friction at the top of the rail 24 is different than the coefficient of friction at the sides. By way of an example, the desired coefficient of friction may be 0.35 at the top of the rail 24 and 0.2 at the sides of the rail. The friction modifier 12 may provide other benefits to the rail 24, such as preventing galling and extending the life of the rail.

Typically in the industry, friction modifier 12 that is applied to the wheels 52 via the gauge side 48 is known as "grease." Friction modifier 12 that is applied to the rail 24 via the field side 50 is known as "top of rail." A variety of substances can be used as the friction modifier 12, such as grease, top-of-rail friction modifiers, and dry film friction modifiers. The optimal amount of friction modification, discussed below, to be used depends on the type of friction modifier and track conditions such as curves or elevation changes. For example, a railroad operating company may dictate that they require a quarter of a teaspoon of top-of-rail friction modifier per twenty wheels that pass over the railroad friction-modification assembly 16 in a particular section of railroad track 14.

The friction modifier 12 is stored on site by the railroad track in the external storage tank 18, as illustrated in FIG. 1. The external storage tank 18 stores bulk amounts of the friction modifier 12. Large external storage tanks 18 provide friction modification for a long period of time without needing to be refilled. The external storage tank has an associated pump. In FIG. 1, the pump is located internally in the external storage tank 18. The pump is typically powered by electricity. The electricity that powers the pump may come from an external power line, a solar panel, a battery, etc. The pump generates a pressure that forces the friction modifier 12 along the tube 20.

External storage tanks 18 may be located periodically along the railroad track. In embodiments, the external storage tanks 18 are concentrated in areas with curves in the track and/or inclines and declines. A single external storage tank 18 may service a plurality of railroad friction-modification assemblies 16, such as where there are multiple adjacent railroad tracks, or in curvy locations that require friction modification at multiple locations along the track. The external storage tank 18 may have insulation or other protection.

The tube 20 is connected between the external storage tank 18 and the railroad friction-modification assembly 16. The tube 20 is a pipe, a line, or a hose that provides a conduit for the friction modifier 12 to flow from the external storage tank 18 to the railroad friction-modification assembly 16. The tube 20 may be formed of rubber, composite, PVC, copper, and/or other polymers or metals. As discussed below, in embodiments of the invention, the friction modifier 12 flows through the tube 20 by pressure exerted by the pump. In other embodiments of the invention, the friction modifier 12 flows through the tube 20 at least in part via the peristaltic action described below. The tube 20 may be partially or fully buried in the ground to prevent damage and abrasion. The tube 20 may be flexible along its entire length, rigid along its entire length, or flexible in one portion and rigid in another portion.

The tube 20 may have a connection segment 56 at either or both ends. The connection segment 56 is adapted to securely but removably couple the tube 20 to the external storage tank 18 or the railroad friction-modification assembly 16. The removal may require the use of a tool, such as a wrench. In other embodiments of the invention, the tube 20 is permanently secured to the inlet valve 30 and/or the external storage tank 18.

The components of the railroad friction-modification assembly 16 will now be discussed, as illustrated in FIGS. 3-8. The railroad friction-modification assembly 16 comprises the inlet valve 30, the expandable membrane 28, the housing 32, the outlet valve 34, and the nozzle 36. The railroad friction-modification assembly 16 is a single unit; however, components such as the expandable membrane 28 may be exchangeable should they become damaged or worn. The railroad friction-modification assembly 16 is rugged, such that it can withstand the weather, forces associated with being adjacent to moving trains, and the sandy or dusty environment of the railroad track.

Figure 3:
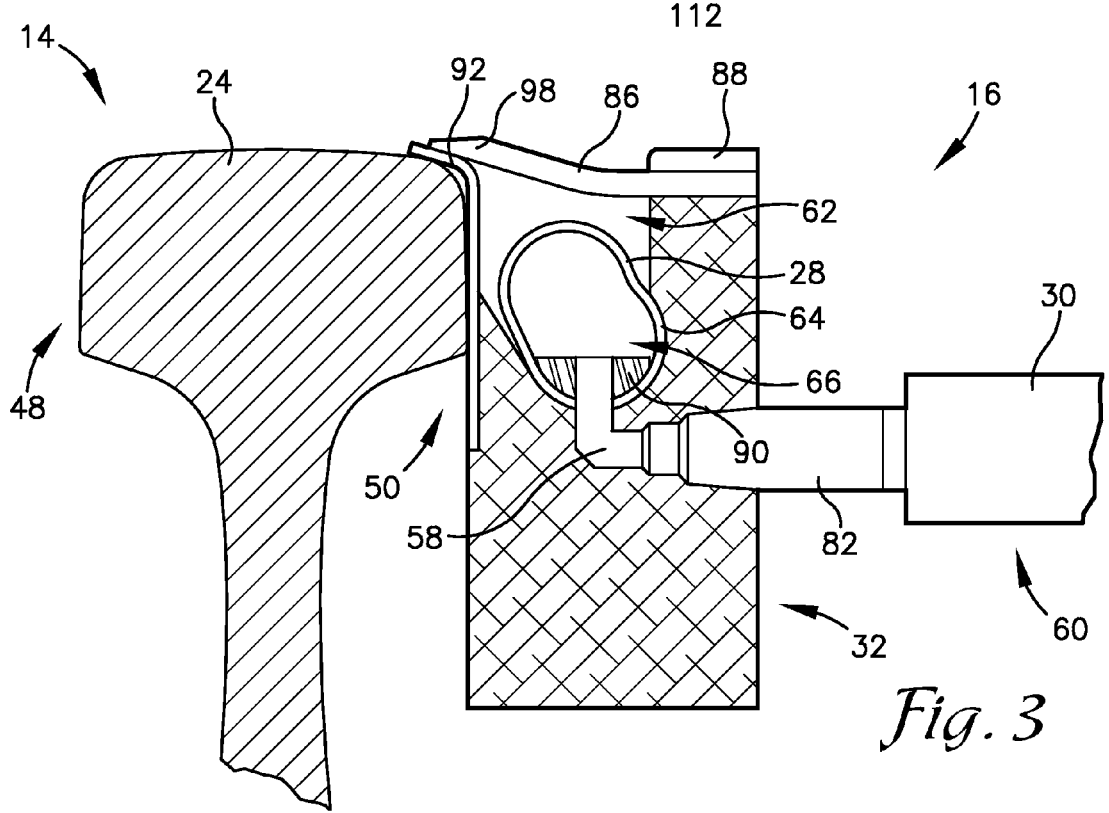
FIG. 3 is a vertical cross-section view of one embodiment of the invention illustrating an inlet valve and the flow of friction modifier into an expandable membrane.

The inlet valve 30, as best illustrated in FIG. 3, receives the friction modifier 12 from the external storage tank 18 via the tube 20. The inlet valve 30 has two openings 58, one for the friction modifier 12 to enter the valve from the tube 20 and one for the friction modifier 12 to exit the valve to the expandable membrane 28. The inlet valve 30 is a check valve 60, also known as a non-return valve or a one-way valve. That is to say that the inlet valve 30 prevents the friction modifier 12 from flowing back into the tube 20 and the external storage tank 18. Check valves 60 are described in more detail below.

In order for the inlet valve 30 to allow friction modifier 12 to flow into the expandable membrane 28, the pressure on the inlet valve 30 must overcome the cracking pressure of the inlet valve 30. The pressure is generated, in embodiments of the invention, via the electrically-powered pump and/or the peristaltic action. As the force generated overcomes the cracking pressure of the inlet valve 30, the inlet valve 30 opens to allow friction modifier 12 to enter the expandable membrane 28.

As illustrated in FIG. 3, the opening 58 of the inlet valve 30 that leads to the expandable membrane 28 may have a bend to alter the direction from which the friction modifier 12 enters the expandable membrane 28. In other embodiments, the exit of the inlet valve 30 leads straight into the expandable membrane 28.

The expandable membrane 28 is expandable and flexible. As friction modifier 12 enters the expandable membrane 28, the expandable membrane 28 grows in size to accommodate the additional friction modifier. The housing 32, discussed below, presents a void 62 or recess to allow the expandable membrane 28 to expand. The expandable membrane 28 is formed of a rubber or other expandable polymer or composite.

Figure 5:
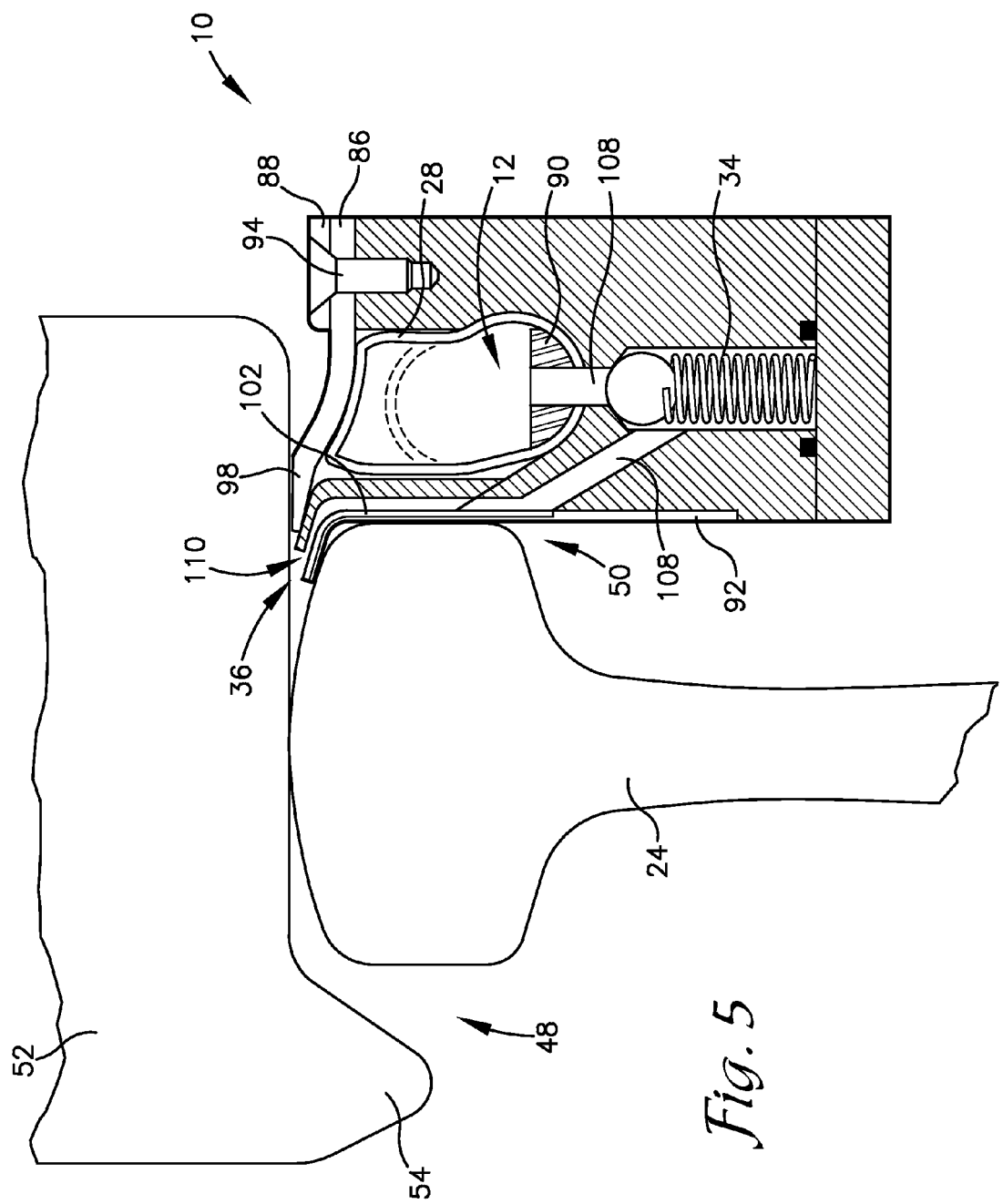
FIG. 5 is a vertical cross-section view of one embodiment of the invention illustrating an the expandable bladder in an expanded state, an outlet valve, and the flow of friction modifier out of a nozzle and onto the rail.

The expandable membrane 28 comprises a wall 64 having a thickness. While the wall 64 of the expandable membrane 28 is expandable and flexible, portions of the expandable membrane 28 may be rigid such as portions that secure the expandable membrane 28 to the housing 32. The wall 64 may decrease in thickness as the expandable membrane 28 expands. The wall 64 may also change shape, as illustrated in FIG. 5, as the expandable membrane 28 fills with friction modifier. The dashed portion of the wall 64 in FIG. 5 depicts the starting shape of the enclosed membrane 28 before the filling with friction modifier 12. The shape of the wall 64 depends in part upon the shape of the void 62 of the housing.

Figure 8:
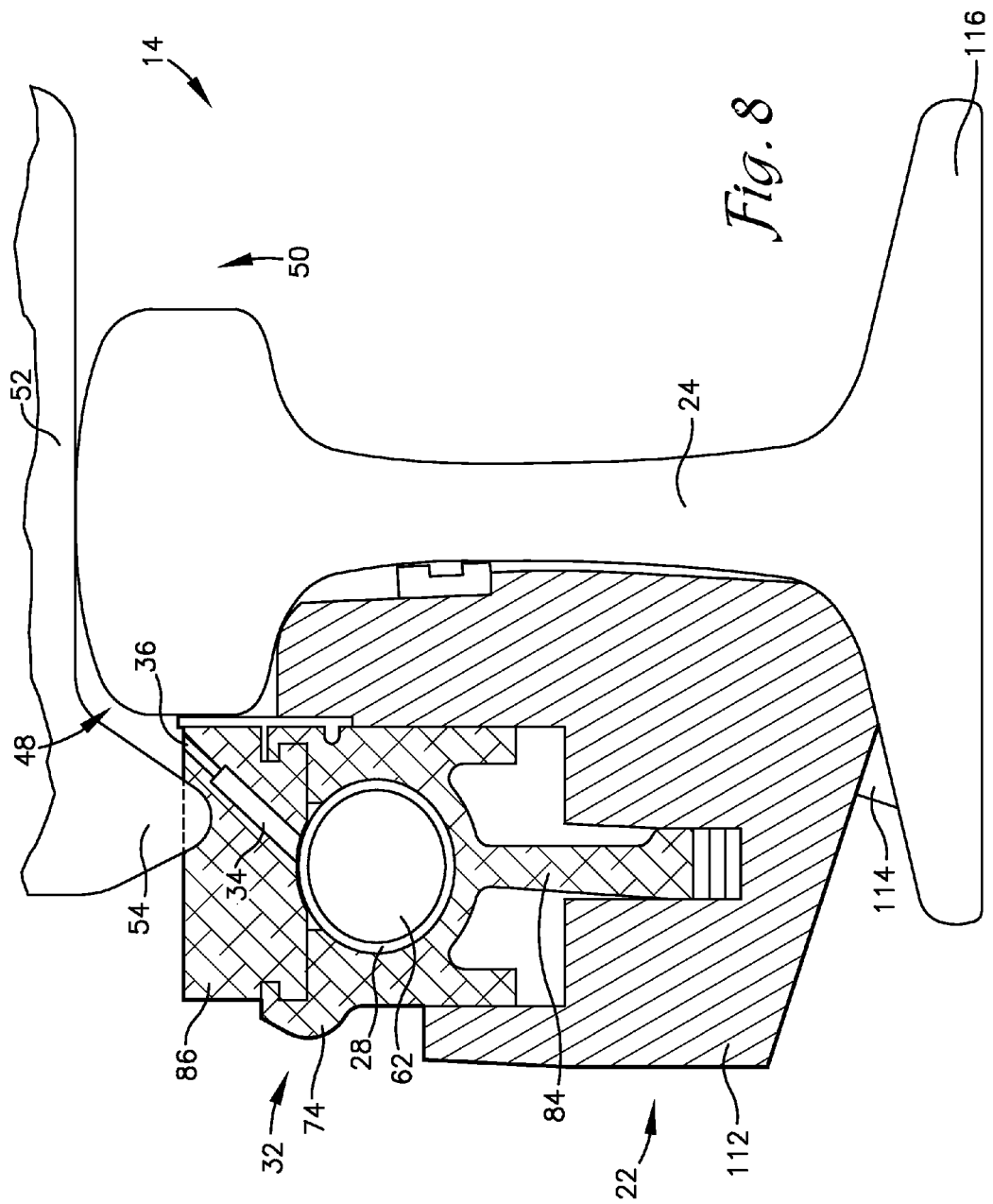
FIG. 8 is vertical cross-section view illustrating another embodiment of the invention in which the railroad friction modification assembly is mounted on the gauge side of the rail.

In embodiments of the invention, as illustrated in FIGS. 3 and 5, the expandable membrane 28 may be anchored or secured to a bottom segment 66 of the void 62. The anchoring keeps the expandable membrane 28 aligned with the inlet valve 30 and the outlet valve 34. The anchoring also ensures that the expandable membrane 28 will expand in an upward direction, i.e. toward the wheel 52 of the railroad car, as it fills with friction modifier 12. In other embodiments, such as illustrated in FIG. 8, the expandable membrane 28 is not anchored.

In embodiments of the invention, the expandable membrane 28 has an elongated shape, such as a cylinder, oriented in a direction parallel with the railroad track. As such, as the wheel 52 moves along the track, a portion of the circumference of the wheel 52 contacts the railroad friction-modification assembly 16. The enclosed membrane 28 expands in a direction perpendicular to the railroad track.

Figure 4:
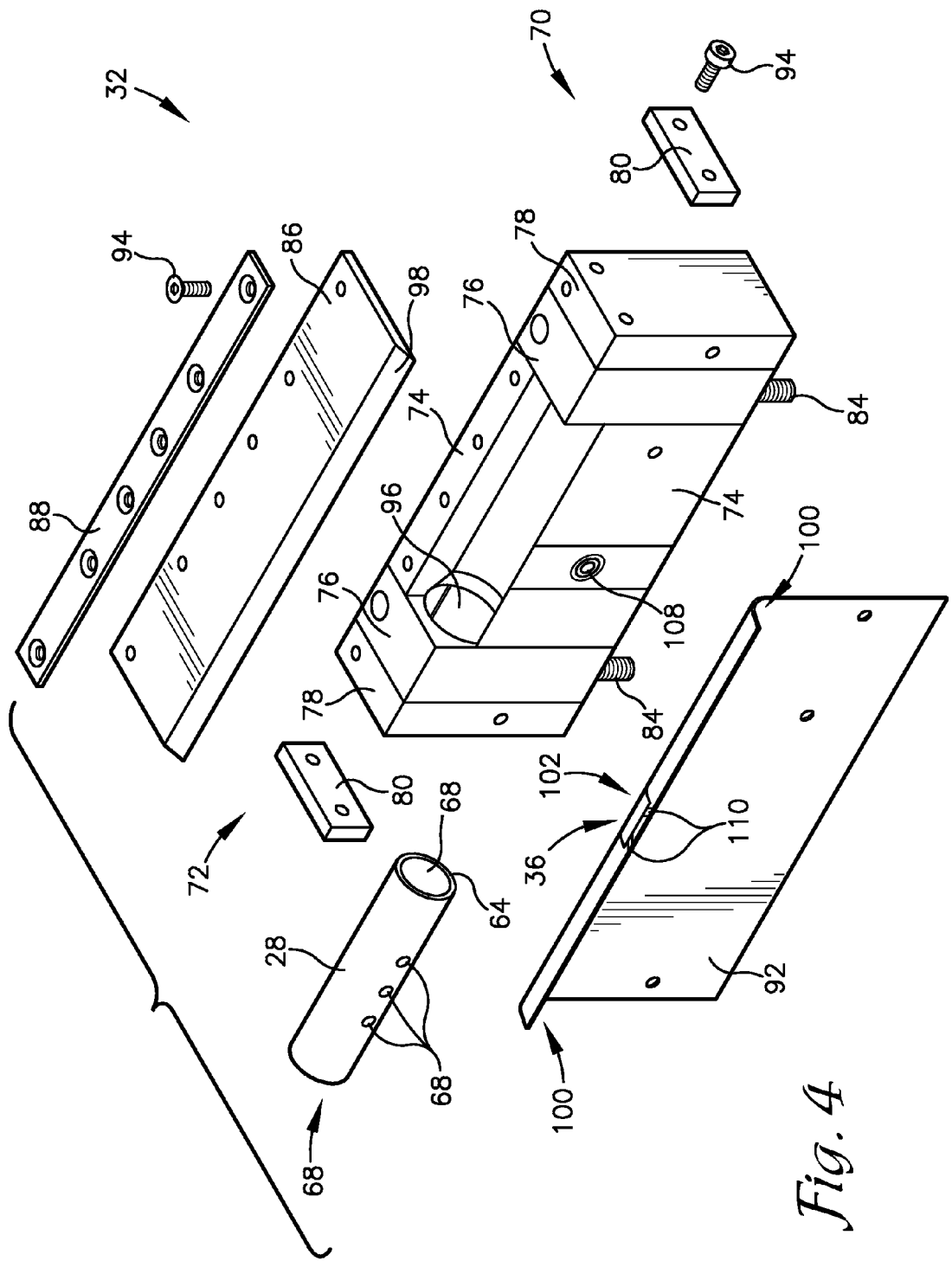
FIG. 4 is an exploded perspective view of the expandable membrane and the components of a housing for the expandable membrane, according to one embodiment of the invention.

As shown in FIG. 4, the expandable membrane 28 is substantially an elongated cylinder that presents an opening 68 on at least one end. The at least one opening 68 allows the expandable membrane 28 to be anchored to the housing 32, as discussed below. The at least one opening 68 is then enclosed after installation such that friction modifier 12 entering the expandable membrane 28 can only leave through the outlet valve 34. The expandable membrane may be enclosed with a plug (not illustrated) that fits into an inner diameter of the cylinder shape. The plug may be secured or clamped at least in part by the housing, as discussed below The expandable membrane 28 may present other openings 68 for the inlet valve 30, the outlet valve 34, as well as anchors or fasteners to secure the enclosed membrane 28. The circular ends of the cylinder shape are perpendicular to the direction that the rail 24 runs. As the wheel 52 travels along the track, the weight of the wheel 52 places a force (either directly or indirectly) that moves along the expandable membrane 28.

A peristaltic pump moves a fluid along a flexible tube. In a typical peristaltic pump, a rotor with a plurality of rollers or wipers compress the flexible tube. As the rotor turns, the rollers or wipers move the fluid by moving the section of the flexible tube which they are compressing. Peristaltic pumps are commonly used in the medical field because the pump components do not come into contact with the fluid. It should be noted, however, that most typical peristaltic pumps keep the fluid under ambient pressure as the fluid moves through the peristaltic pump. In this invention, the fluid may come under increased pressure due to the great forces involved with the passing wheels 52 of the railroad cars 46 and due to the lack of a complete compression of the expandable membrane 28.

The railroad friction-modification assembly 16 acts as a peristaltic pump to move the friction modifier from the enclosed membrane 28 to the rail 24. As the wheel 52 of the railroad car 46 moves along the expandable membrane 28 (either directly or indirectly), the wheel 52 at least partially compresses the expandable membrane 28. The peristaltic action moves from expandable membrane 28 through the nozzle 36 onto the rail. In some embodiments, at least one sensor detects the number of passing wheels 52 and activates the pump in or associated with the external storage tank 18 to pump an amount of friction modifier 12, based upon the number of wheels 52 sensed by the sensor, through the tube 20. The friction modifier 12 overcomes the cracking pressure of the inlet valve 30 and enters the expandable membrane 28. As such, the expandable membrane 28 has a substantially equivalent amount of friction modifier 12 during each train passing. While the pump typically operates periodically, i.e. once per every certain number of passing wheels, the peristaltic pump action of the railroad friction-modification assembly 16 may provide friction modifier 12 during a plurality of passing wheels 52 between operations of the pump. This may provide a better distribution of friction modifier 12 onto the rail 24.

In one embodiment, the inlet valve 30 is situated near a first end 70 of the railroad friction-modification assembly 16 and the outlet valve 34 is situated near a second end 72 of the railroad friction-modification assembly 16. This offsetting of the inlet valve 30 and the outlet valve 34 facilitates the peristaltic action.

In one embodiment, the inlet valve 30 is located substantially in the center of the expandable membrane 28, one outlet valve 34 is located near the first end 70, and one outlet valve 34 is located near the second end 72. In another embodiment (not illustrated) a first inlet valve is located near the first end 70, a second inlet valve is located near the second end 72, and the outlet valve 34 is located substantially in the center of the expandable membrane 28.

The housing 32 of the expandable membrane 28, as best illustrated in FIG. 4, will now be discussed. At least a portion of the housing 32 is substantially rigid so as to provide support for the expandable membrane 28. At least a portion of the housing 32 is flexible so as to allow the expandable membrane 28 to expand and contract. The housing 32 also interfaces with, or includes, the mounting assembly 22 for mounting and keeping the railroad friction-modification assembly 16 in the proper location for the peristaltic action.

One embodiment of the housing 32 comprises a main body 74, two end expansion-limiting segments 76, two end cap segments 78, two end clamp bar segments 80, an inlet valve receptor 82, a mounting interface apparatus 84, a wear strip 86, a top clamp bar 88 for the wear strip 86, an anchor segment 90 to anchor the expandable membrane 28 to the bottom segment 66 of the void 62 (as discussed above), the outlet valve 34, a nozzle plate 92, the nozzle 36, and a plurality of fasteners 94. In another embodiment of the invention, the housing 32 further comprises the flexible sheet 38. In other embodiments of the invention, the housing 32 comprises a combination of the above-mentioned components.

The main body 74 of the housing 32 presents the void 62 into which at least a portion of the expandable membrane 28 is placed. In embodiments, the main body 74 is substantially a rectangular prism with the void 62 through at least a portion being cylindrically shaped, as shown in FIG. 4. The main body 74 includes the inlet valve receptor 82 and the outlet valve 34. The main body 74 is formed of a metal, such as steel, or a hardened polymer. The inlet valve receptor 82 provides a connection point for the tube 20 to connect at the connection segment 56 to the opening 58 of the inlet valve 30.

In embodiments, as discussed above, in which the expandable membrane 28 has at least one opening 68, the housing 32 may comprise the end expansion-limiting segment 76. The end expansion-limiting segment 76 is adapted to compress the opening 68 such that it retains the friction modifier 12 and its generally round shape. The end expansion-limiting segment 76 presents a cylindrical void 96 or a recess into which the opening 68 of the expandable membrane 28 is placed. In embodiments of the invention, the end expansion-limiting segment 76 is a separate component from the main body 74, secured by fasteners 94 or welding. In other embodiments, the end expansion-limiting segment 76 and the main body 74 are unitary.

In embodiment in which the expandable membrane 28 has at least one opening 68, the housing 32 may comprise at least one end cap segment 78. Embodiments of the invention may utilize the end cap segment 78 in lieu of or in addition to the end expansion-limiting segment 76. The end cap segment 78 is adapted to provide an end to the expandable membrane 28 and provide lateral support against the pressure exerted by the friction modifier 12. In embodiments of the invention, the end cap segment 78 presents a cylindrical recess (not illustrated). In embodiments of the invention, the end cap segment 78 is a separate component from the main body 74, secured by fasteners 94 or welding. In other embodiments the end cap segment 78 and the main body 74 are unitary. In some embodiments the end cap segment 78 and the end expansion-limiting segment 76 are unitary.

Embodiments of the invention comprise two end clamp bar segments 80. The end clamp bar segment 80 is adapted to be fastened onto the end cap segment 78, as illustrated in FIG. 4, or other portion of the housing 32. The end clamp bar segment 80 receives the fastener 94 and provides additional lateral support against the pressure generated by the pressurized friction modifier 12. In some embodiments of the invention, each of the end clamp bars 80 secures an end of the flexible sheet 38. The flexible sheet 38 may additionally or in the alternative be secured as described below.

The housing 32 is generally an elongated rectangular prism, cylinder, or bar. The elongated shape presents a length. The housing 32 is oriented such that the length is parallel with the rail. The housing 32 may be partially under or over the rail. In embodiments of the invention, the length is 3 inches to 60 inches, 6 inches to 36 inches, or 9 inches to 12 inches. The height of the housing 32, i.e. the side that is substantially vertical upon installation, may be 2 inches to 9 inches, 3 inches to 6 inches, or 4 inches to 5 inches.

Embodiments of the invention comprise the wear strip 86 atop the housing 32. The wear strip 86 generally has a thin rectangular prism shape that may present a narrowing end 98. The narrowing end 98 is positioned toward the rail, such that the wheel passes over or near it. The wear strip 86 is formed of a ruggedized and flexible material, such as a hardened rubber, Kevlar, or composite. The wear strip 86 is adapted to withstand the forces of many wheels moving across its length. As the wheel 52 of the railroad car 46 moves along the wear strip 86, the ruggedized but flexible wear strip 86 transfers at least a portion of the force of the weight to the expandable membrane 28. As the expandable membrane 28 inflates with friction modifier 12 due to the peristaltic action, the wear pad rises slightly. In this risen position, the wear pad receives a greater force from the passing wheel 52 of the railroad car 46. This greater force overcomes the cracking pressure of the outlet valve 34, discussed below, and expels friction modifier 12 through the nozzle 36 onto the rail. As the friction modifier 12 is expelled, the expandable membrane 28 deflates and the wear pad therefore lowers out of the risen state. In this way, the railroad friction-modification assembly 16 stays in equilibrium.

Because the wheels 52 of railroad cars 46 can be of slightly different sizes and shapes due to wear, the wear strip 86 is adapted to withstand large, violent forces being placed on it. The wear pad is also easily exchangeable should it become worn or damaged. The wear pad is replaced by removing the fasteners 94 and/or the top clamp bar 88, exchanging the damaged wear pad for a new one, and securing the fasteners 94 and/or the top clamp bar 88.

The wear strip 86 is secured to the top of the housing 32 via the top clamp bar 88 and at least a portion of the plurality of fasteners 94. The top clamp bar 88 is formed of a metal or a hardened polymer. In other embodiments, the wear strip 86 is secured to the top of the housing 32 via the fasteners 94 and a plurality of washers (not illustrated). In still other embodiments, the wear strip 86 is secured to the top of the housing 32 via the fasteners 94 in lieu of the top clamp bar 88.

Figure 6:
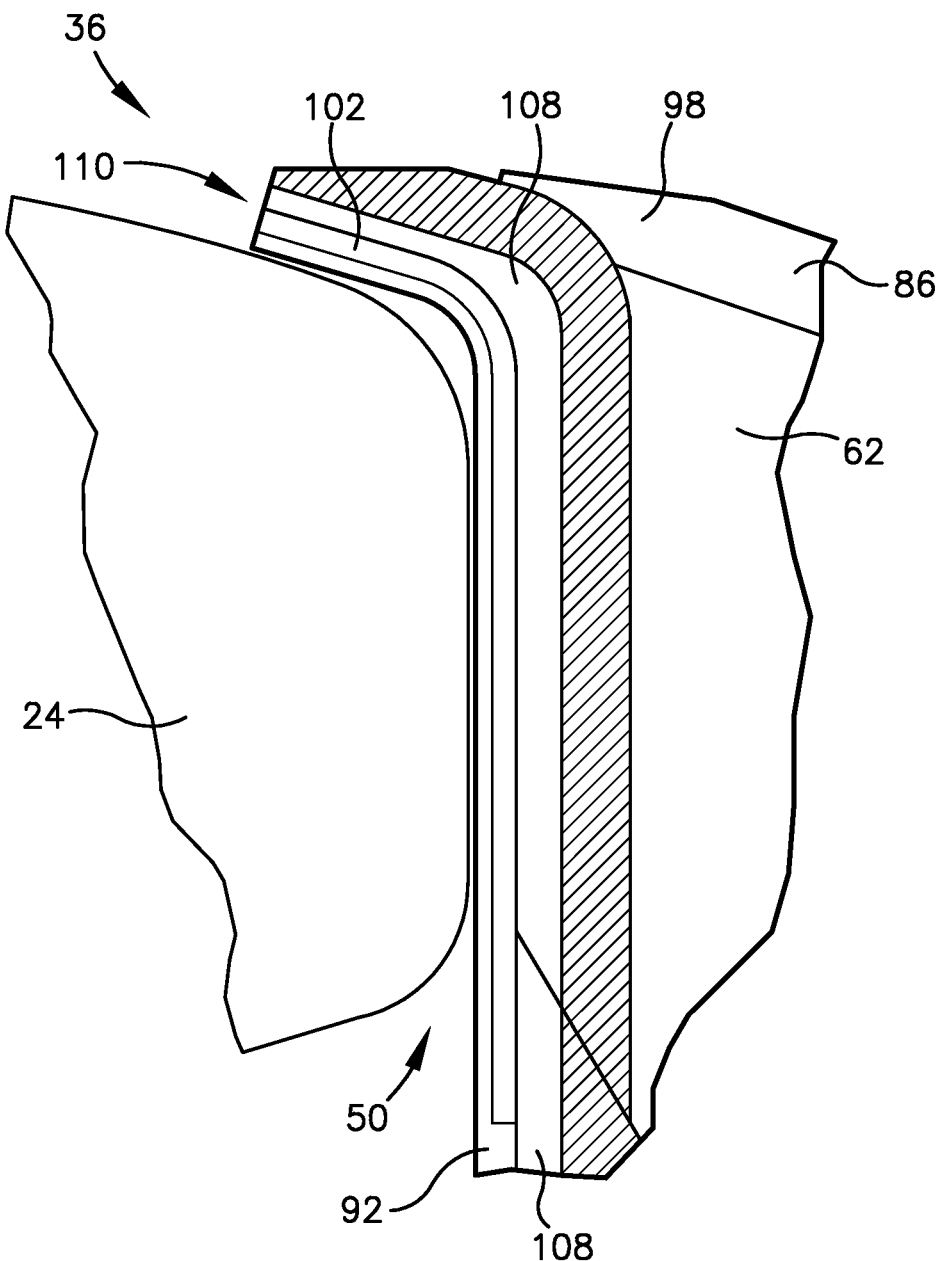
FIG. 6 is a fragmentary view of the vertical cross-section view of FIG. 5, illustrating the nozzle in more detail.

The nozzle plate 92 interfaces with the rail 24. The nozzle plate 92 ensures that the nozzle 36 is positioned and oriented such that it can direct the friction modifier 12 onto the rail 24. In embodiments of the invention, the nozzle plate 92 is a substantially flat piece of metal that is bent at an interfacing segment 100 to complement the shape of the rail. The complementary shape allows the nozzle 36 to be situated onto the rail 24 such that expelled friction modifier 12 is placed on or near the top of the rail. In embodiments of the invention, the nozzle plate 92 presents a channel 102 through which the friction modifier 12 flows from the outlet valve 34 to the nozzle 36. The nozzle 36 is discussed in depth below. The channel 102 is a recess through which the friction modifier 12 flows. In some embodiments, the friction modifier 12 flows out the outlet valve 34 and into the channel 102. The friction modifier 12 flows between the channel 102 and an outer portion of the housing 32, as best illustrated in FIG. 6. The channel 102 may be formed at least in part by spacing a portion of the nozzle plate 92 away from the housing 32. In addition or in the alternative, the channel 102 may be a recess in the outer portion of the housing 32.

Figure 7:
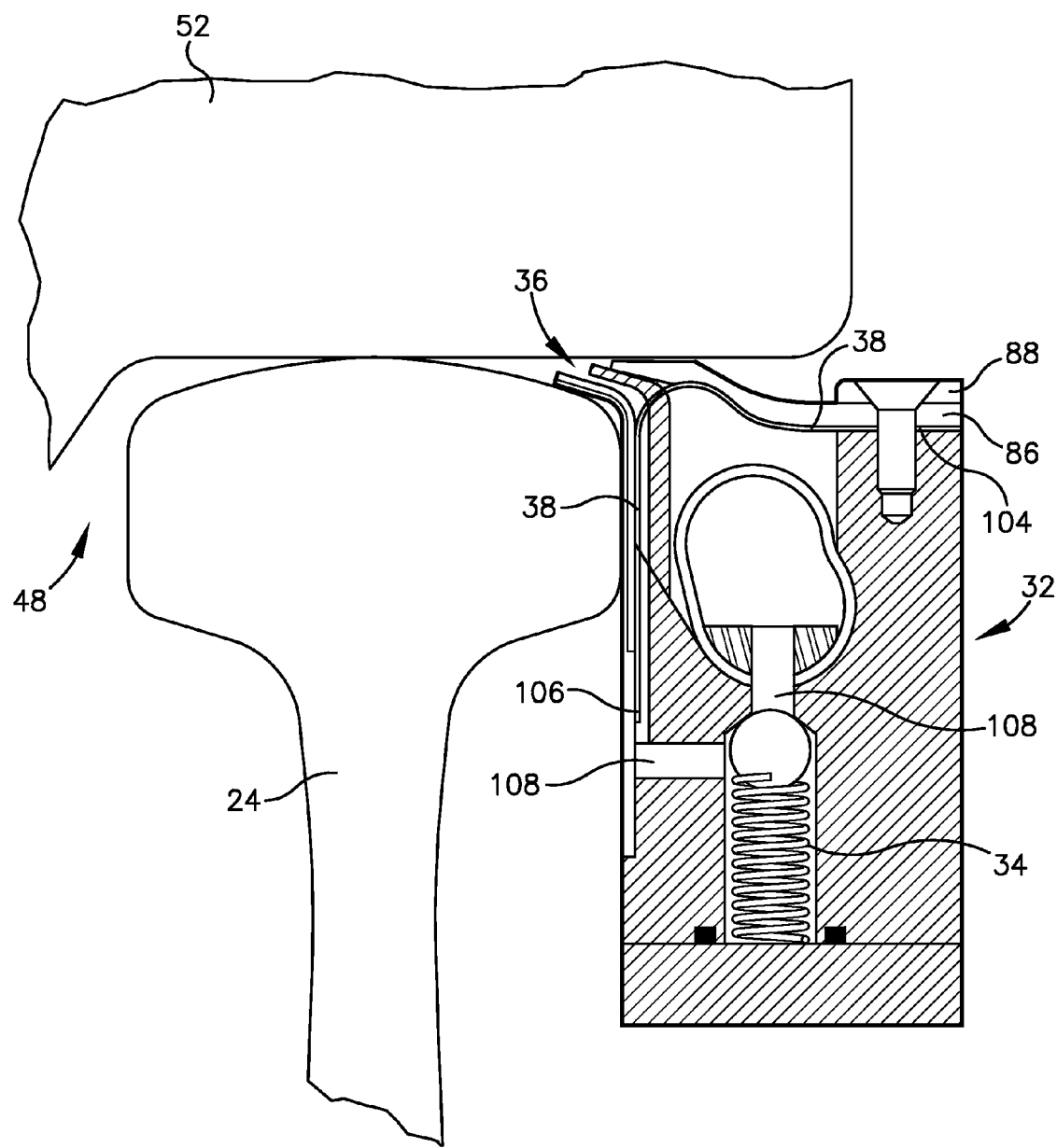
FIG. 7 is a vertical cross-section view illustrating a flexible sheet to prevent over-inflation of the expandable membrane.

In some embodiments of the invention, the housing 32 further comprises the flexible sheet 38, as illustrated in FIG. 7. The flexible sheet 38 is disposed between the wear strip 86 and the expandable membrane 28. In embodiments of the invention, the flexible sheet 38 is secured at a top segment 104 by the plurality of fasteners 94 and/or the top clamp bar 88. A bottom segment 106 of the flexible sheet 38 is secured to the nozzle plate 92 or to the housing 32. Respective side segments of the flexible sheet 38 may additionally or in the alternative be secured to the housing 32.

The flexible sheet 38 prevents abrasion to the expandable membrane 28 from dust or other particles getting below the wear strip 86. The flexible sheet 38 also prevents the over inflation of the expandable membrane 28. The flexible sheet 38 is not substantially expandable. In this way, the flexible sheet 38 prevents the expandable membrane 28 from continuing to inflate despite whether the cracking pressure of the inlet valve 30 has been overcome and forces the friction modifier 12 to instead exit through the outlet valve 34 and the nozzle 36. The flexible sheet 38 can also act as the wear strip 86, should the wear strip 86 become worn or damaged. In another embodiment of the invention, the railroad friction-modification assembly 16 comprises the flexible sheet 38 in lieu of the wear strip 86.

The flexible sheet 38 is formed of a hardened, constricting, but flexible material such as Kevlar, Tyvek, rubber, composites, expanded metal, chain mail, or a combination thereof. The material is abrasion resistant to prevent damage to the expandable membrane 28. The flexible sheet 38 increases the useful life of the railroad friction-modification assembly 16.

The outlet valve 34 of the railroad friction-modification assembly 16 opens to allow friction modifier 12 to flow out of the expandable membrane 28 and onto the rail 24 via the nozzle 36. The outlet valve 34 has two openings 108, one for the friction modifier 12 to enter the valve from the expandable membrane 28 and one for the friction modifier 12 to exit the valve to the nozzle 36. The outlet valve 34 is a check valve 60, like the inlet valve 30. As discussed above, the outlet valve 34 works via a peristaltic action to move fluid from the external storage tank 18, through the inlet valve 30 and the expandable membrane 28, and onto the rail. Because the train may come from either direction, the outlet valve 34 may draw from multiple openings 108 within the expandable membrane 28. In another embodiment, the railroad friction-modification assembly 16 comprises two or more outlet valves 34.

The application of a force from the wheel 52 of the railroad car 46 to the wear strip 86 at least partially compresses the expandable membrane 28. This force increases the pressure within the expandable membrane 28 until the pressure exceeds the cracking pressure of the outlet valve 34. Upon the cracking pressure being achieved, the outlet valve 34 opens to permit the friction modifier 12 to flow out of the expandable membrane 28. The outlet valve 34 directs the flow of friction modifier 12 through the opening in the outlet valve 108, through the channel 102 in the nozzle plate 92, and into the nozzle 36.

It should be noted that both the inlet valve 30 and outlet valve 34 are check valves 60. As discussed above, a check valve 60 allows from in one direction upon the application of a certain cracking pressure, but prevents flow in the opposite direction. As schematically illustrated in FIGS. 5 and 7, in some embodiments of the invention the check valve 60 may be a "ball check valve." In other embodiments, the check valve may be a "diaphragm check valve, a "swing check valve" also known as a "tilting disc check valve," a "stop-check valve," a "lift-check valve," an "inline check valve," or a "duckbill check valve." In addition, the type of check valve 60 utilized for the inlet valve 30 may be different than the type of check valve 60 utilized for the outlet valve 34.

It should also be noted that the respective cracking pressures of the inlet valve 30 and the outlet valve 34 may be the same, substantially the same, or different. In some embodiments, the inlet valve 30 and outlet valve 34 do not open simultaneously. For example, the outlet valve 34 opens upon initial compression contact of the wheel 52 and then the inlet valve 30 opens as the wheel 52 travels along the railroad friction-modification assembly 16. In this example, the outlet valve 34 would have a higher cracking pressure than the inlet valve 30. In some embodiments, both the inlet valve 30 and the outlet valve 34 may be open simultaneously, such that the friction modifier 12 flows through the expandable membrane 28.

In some embodiments of the invention, the outlet valve 34 and inlet valve 30 are exchangeable. In other embodiments, the respective cracking pressure of the inlet valve 30 and the outlet valve 34 is adjustable. This may be advantageous because different types of friction modifier may require different cracking pressures. Increasing or decreasing the amount of friction modifier applied to the rail 24 may also be achieved by changing the cracking pressure. Similarly, varying weather and climatic conditions may also require different cracking pressures.

As best illustrated in FIG. 6, the nozzle 36 directs the flow of friction modifier onto the rail. The nozzle 36 presents a nozzle tip 110, which is an opening or void through which the friction modifier 12 leaves the nozzle 36. The nozzle tip 110 may be of any number of different shapes. The nozzle 36 controls the direction and characteristics of the flow of friction modifier onto the rail. The direction is controls by the complementary shape of the nozzle plate 92. In one embodiment, the direction of the flow of friction modifier is substantially parallel with the upper portion of the rail. The nozzle 36 may reduce the size of the nozzle tip 110 to accelerate the flow of friction modifier onto the rail. In other embodiments, the nozzle 36 may increase the opening size to prevent waste from excessive flow rates.

In embodiments, the nozzle plate 92 and the nozzle 36 are sized and shaped such as to minimize or eliminate the contact between the nozzle 36 and the wheels 52 of the railroad car. This may be advantageous to prevent damage to the nozzle 36, which may alter the size of the opening. In one embodiment of the invention, the nozzle 36 is formed of metal to withstand the forces of the wheels 52 of the railroad car. In another embodiment, the nozzle 36 is formed of a hardened polymer with sufficient elasticity to return to its original shape following a compression by the wheel.

In one embodiment of the invention, as best illustrated in FIG. 4, the nozzle 36 is substantially Y-shaped, such that it presents two nozzle tips 110. The Y-shape may be advantageous to preventing the waste of friction modifier 12. As the wheel 52 compresses the expandable membrane 28, the nozzle 36 may eject friction modifier 12 directly onto the wheel 52 instead of the rail. In order to avoid this, the nozzle 36 of one embodiment has a Y-shape so that approximately half of the friction modifier 12 exits through each opening at the top of the Y-shape. This will ensure that no matter the location of the wheel, at least a portion of the friction modifier 12 is being directly placed onto the rail.

The mounting assembly 22 of the railroad friction-modification system 10, as best illustrated in FIGS. 1 and 10, will now be discussed. In embodiments of the invention, the mounting assembly 22 comprises a mounting bracket 112 and at least one rail anchor 114. The mounting bracket 112 is secured to the mounting interface apparatus 84 of the housing 32.

The rail anchor 114 secures the mounting bracket 112 to a rail base 116. The rail anchor 114 may be at, adjacent to, or near a cross tie 118. The rail anchor 114 may be a "J-bolt" type (as illustrated in FIG. 10) or may be a "drive-on" type. The J-bolt type of rail anchor 114 requires that an installer to place the J-bolt under the rail base 116 of the rail 24 and then tighten a nut onto the end of the J-bolt to hold the mounting bracket 112 securely against the rail base 116. The drive-on railroad anchor is installed by placing the railroad anchor against the rail base 116 and applying a great force (such as via a sledgehammer) to the railroad anchor. This force drives the drive-on railroad anchor under the rail base 116. Both J-bolt type and drive-on type rail anchors 114 can also be used to mount other items to the rail. These other items could include the railroad friction-modification assembly 16 itself (without the use of the mounting bracket 112), sensors, passive bars (discussed below), tubes, etc.

The secured mounting bracket 112 provides a steady and secure platform on which to mount the railroad friction-modification assembly 16. The mounting bracket 112 is formed of a metal or hardened polymer. The mounting bracket 112 may present a plurality of openings for the securing of the mounting interface apparatus 84 of the housing 32 and/or the rail anchor 114. In one embodiment of the invention, the mounting interface apparatus 84 comprises a plurality of threaded bolts that extend out of the bottom of the housing 32. The installer places the threaded bolts through the holes in the mounting bracket 112 and secures the housing 32 to the mounting bracket 112 with the use of a nut. In another embodiment, the mounting bracket 112 is welded or otherwise permanently secured to the housing 32.

In some embodiments, as illustrated in FIGS. 1 and 10, the mounting assembly 22 further comprises a shock absorber 120. The shock absorber 120 is formed of a relatively soft material, such as foam or rubber. The shock absorber 120 minimizes the damage caused by unusually shaped wheels. The shock absorber reduces some of the force of the wheel 52, such that the peristaltic action still operates while not exposing the railroad friction-modification assembly 16 to excessive damage. The shock absorber may be advantageous for railroad friction-modification assemblies 16 mounted on the gauge side 48 of the rail 24, because the flange 54 of the wheel 52 causes greater shock to the railroad friction-modification assembly 16. The shock absorber may also be advantageous for railroad friction-modification assemblies 16 mounted on the field side 50 of the rail 24.

In embodiments of the invention, as illustrated in FIGS. 1-3 and 5-7, the railroad friction-modification assembly 16 is adapted to be installed on the field side 50 of the rail. As discussed above, the field side 50 of the rail 24 faces outward, away from the opposing rail 44. By installing the railroad friction-modification assembly 16 on the field side 50, the nozzle 36 can place the friction modifier 12 on the top of the rail. Because the flange 54 of the wheel 52 of the railroad car 46 travels along the gauge side 48 of the rail, applying friction modifier 12 from the field side 50 allows the friction modifier 12 to be placed directly onto the rail 24 instead of onto the wheel.

In other embodiments of the invention, the railroad friction-modification assembly 16 is adapted to be installed on the gauge side 48 and place the friction modifier near the top of the rail, not illustrated. In these embodiments, the flange 54 of the wheel 52 of the railroad car 46 depresses the wear strip 86 of the housing 32. Also, in these embodiments, the nozzle 36 is longer to enable the friction modifier 12 to be placed between the rail and the flange 54 of the wheel 52.

In yet other embodiments of the invention, as illustrated in FIG. 8, the railroad friction-modification assembly 16 is adapted to be installed on the gauge side 48 and provides friction modifier for the flange 54 of the wheel 52 to contact the rail 24. In these embodiments, the friction modifier 12 is a type of grease. The wear strip 86 of this embodiment is substantially porous and the nozzle 36 deposits the friction modifier 12 onto the wear strip 86, instead of onto the rail. As the flange 54 of the wheel 52 moves along the wear strip 86, it picks up the friction modifier 12. The flange 54 also compresses the expandable membrane 28 to perform the peristaltic action. In embodiments, as illustrated in FIG. 8, the wear strip 86 is located below the rail, not up against it. This allows the flange 54 of the wheel 52 to contact the wear strip 86 without causing excessive damage.

In yet further embodiments of the invention, not illustrated, the railroad friction-modification assembly 16 is adapted to provide both grease to the flange 54 of the wheel 52 and top-of-rail friction modifier to the top of the rail. This would provide the benefits of both types of friction modifier. The railroad friction-modification system 10 of these embodiments may utilize two external storage tanks 18, two tubes, and two expandable membranes 28.

Other components of the railroad friction-modification system 10 will now be discussed. Some embodiments of the railroad friction-modification system 10 may comprise the external storage tank 18, the tube 20, the railroad friction-modification assembly 16, the second railroad friction-modification assembly 26, and another tube 20. The second railroad friction-modification assembly 26 may be secured to a different location along the same rail, an opposing rail 44 of the same section of railroad track 14, or another section of railroad track (such as a parallel section of railroad track). Some embodiments of the invention comprise a plurality of second railroad assemblies 16 and a plurality of second tubes 20 secured to a plurality of the above-mentioned locations. Other embodiments of the invention further comprise a plurality of external storage tanks 18.

Utilizing a plurality of railroad assemblies 16 per external storage tank 18 may be advantageous because it reduces the duplicity of relatively expensive external storage tanks. It also reduces the maintenance and monitoring for the section of railroad track 14. However, utilizing a plurality of railroad assemblies 16 per external storage tank may be disadvantageous because it increases the distance that the friction modifier 12 must travel through the tube 20. A higher pressure may be necessary to bring the friction modifier 12 through the longer distances, so railroad friction-modification assemblies 16 near the external storage tank 18 may provide more friction modifier 12 than railroad friction-modification assemblies 16 far from the external storage tank 18.

A plurality of railroad friction-modification assemblies 16 within the railroad friction-modification system 10 modify the friction of more than one rail or the same rail at different locations. In some embodiments, instead of adjusting the amount of friction modifier that the railroad friction-modification assembly 16 places on the rail, the railroad friction-modification system 10 adjusts the interval at which the railroad friction-modification assemblies 16 are located. For example, the railroad friction-modification system 10 may apply more friction modifier, or apply friction modifier in a more frequent interval along the length of the rail, on the outer rail of a curve in the section of railroad track 14. This is because the outer rail of a curve experiences more lateral force from the train, and therefore requires a lower coefficient of friction for the railroad cars 46 to operate safely.

Because both rails 24 of the section of railroad track 14 require friction modification, some embodiments of the invention utilize two railroad friction-modification assemblies 16, each of which are secured to the field side 50 of each rail. In some embodiments, the two railroad friction-modification assemblies 16 are substantially similar. In these embodiments, the external storage tank 18 may comprise two tubes 20, each of which lead to the respective inlet valves 30 of the railroad friction-modification assemblies 16. In other embodiments, such as around a curve, the railroad friction-modification assemblies 16 may not be substantially opposite each other, and/or there may be additional railroad friction-modification assemblies 16 installed on the outer rail of the curve.

In other embodiments, the two railroad friction-modification assemblies 16 of the railroad friction-modification system 10 are different. For example, in some embodiments, there may be an "active bar" and a "passive bar." The active bar pumps the friction modifier 12 through a peristaltic action and is therefore substantially similar to the above-described railroad friction-modification assembly 16. The passive bar receives friction modifier from the active bar but does not pump the friction modifier 12.

In one embodiment, the passive bar is a component of the railroad friction-modification assembly 16. For example, the passive bar may comprise a secondary tube 42 coming from the outlet valve 34 and a secondary nozzle 40 that mounts on the field side 50 of the opposing rail 44. In another embodiment, the passive bar is substantially similar to the railroad friction-modification assembly 16 but instead comprises a non-expandable expandable membrane in the housing 32.

A method of installing the railroad friction-modification system 10 will now be discussed. In one embodiment, the method comprises the following steps: installing the external storage tank 18 for storing the friction modifier 12 near the rail; installing the mounting assembly 22 adjacent to the rail; securing the railroad friction-modification assembly 16 to the mounting assembly 22; installing the tube 20 connecting the external storage tank 18 to the inlet valve 30 of the railroad friction-modification assembly 16; and filling the external storage tank 18 with the friction modifier 12.

The method of installing the railroad friction-modification system 10 may further comprise the following steps: analyzing a set of conditions related to the railroad track to determine an optimal amount of friction modification, determining the amount of friction modifier deposited on the rail, adjusting the amount of friction modifier deposited on the rail 24 until the amount of friction modifier deposited is approximately equal to the optimal amount of friction modifier. The optimal amount of friction modifier may be expressed in units such as "mL per wheel that passes," "teaspoons per 20 wheels that pass," etc. The set of conditions related to the railroad track may include, but are not limited to, the geographic location of the section of railroad track 14, the incline or decline of the section or in the vicinity, the amount of curvature of the section or in the vicinity, the climate of the location, the average amount of railroad traffic on the section, and the average type of railroad traffic on the section. The optimal amount of friction modifier may also change with the changing of the season or the changing of the type and amount of railroad traffic.

The adjusting of the amount of friction modifier deposited on the rail 24 by the railroad friction-modification assembly 16 may be done in a number of ways. Example of methods for altering the amount of friction modifier deposited on the rail 24 include, but are not limited to, changing the type of friction modifier, adjusting the viscosity of the friction modifier, altering a setting on the inlet valve 30 and/or the outlet valve 34 to alter the respective cracking pressure, exchanging the inlet valve 30 and/or the outlet valve 34 to install another valve having a different cracking pressure, installing the flexible sheet 38, replacing the flexible sheet 38 with another size or type of flexible sheet, tightening or loosening the flexible sheet 38, replacing the nozzle 36 with another size or type of nozzle 36, and adjusting the location or orientation of the mounting assembly 22.

A method of using the railroad friction-modification system 10 comprises the following steps: filling the external storage tank 18 with friction modifier 12, maintaining the railroad friction-modification system 10, replacing the wear strip 86 when it become worn or damaged, and replacing the expandable membrane 28 when it becomes worn or damaged. The replacing of the wear strip 86 and/or the expandable membrane 28 may be performed on site, or the railroad friction-modification assembly 16 may be removed from the mounting assembly 22 and transported to another location for maintenance.

Changes in weather, such as changes in the season, may require changes to the type of friction modifier, the cracking pressure on either or both of the inlet valve 30 and the outlet valve 34, the interval between railroad friction-modification assemblies 16, the amount of friction modifier emplaced on the or other adaptations.

Although the invention has been described with reference to the exemplary embodiments illustrated in the attached drawings, it is noted that equivalents may be employed and substitutions made herein without departing from the scope of the invention as recited in the claims. For example,

The invention claimed is:

1. A railroad friction-modification system for applying a friction modifier to a section of railroad track, the system comprising:
   an external storage tank for storing the friction modifier;
   a railroad friction-modification assembly including—
      an expandable membrane for storing the friction modifier within the railroad friction-modification assembly;
      an inlet valve for receiving the friction modifier from the external storage tank,
      wherein the inlet valve is adapted to prevent the friction modifier from flowing back to the external storage tank;
      a housing for securely containing the expandable membrane,
      wherein the housing is adapted to be installed adjacent to the section of railroad track;
      an outlet valve for expelling the friction modifier from the expandable membrane,
      wherein the friction modifier is expelled from the expandable membrane by the weight of a railroad car pressing on the expandable membrane;
      a nozzle for directing the expelled friction modifier onto a rail of the section of railroad track;
   a tube connecting the external storage tank to the inlet valve of the railroad friction-modification assembly
   a pump adapted to generate a pressure that pushes the friction modifier through the tube; and
   a mounting assembly for mounting the railroad friction-modification assembly adjacent to the rail of the section of railroad track.

2. The railroad friction-modification system of claim 1, wherein the expandable membrane is elongated parallel to the rail such that the expandable membrane receives a portion of a circumference of a wheel of the railroad car.

3. The railroad friction-modification system of claim 1, wherein the railroad friction-modification system pumps the friction modifier out of the expandable membrane and onto the rail via a peristaltic action.

4. The railroad friction-modification system of claim 1, wherein railroad friction-modification assembly is mounted on a field side of the rail of the section of railroad track, such that the nozzle emplaces the friction modifier atop the rail.

5. The railroad friction-modification system of claim 1, wherein the nozzle has a substantially Y-shape, such that it expels the friction modifier onto the section of railroad track in two locations.

6. The railroad friction-modification system of claim 1, wherein the housing comprises:
a main body presenting a void,
wherein the expandable membrane is disposed within the void; and
a wear strip secured to the main body,
wherein at least a portion of the wear strip is adapted to rise as the expandable membrane fills with friction modifier,
wherein a wheel of the railroad car will contact the wear strip and apply said weight of the railroad car to the expandable membrane.

7. The railroad friction-modification system of claim 6, wherein the housing further comprises:
a flexible sheet secured to the housing between the expandable membrane and the wear strip,
wherein the flexible sheet is adapted to prevent abrasion to and over-inflation of the expandable membrane.

8. The railroad friction-modification system of claim 1, further comprising a second railroad friction-modification assembly secured to an opposing rail of the section of railroad track.

9. The railroad friction-modification system of claim 8,
wherein the railroad friction-modification assembly and the second railroad friction-modification assembly are substantially similar,
wherein the railroad friction-modification system further comprises—
a second tube connecting the external storage tank to the inlet valve of the second railroad friction-modification assembly; and
a second mounting assembly for mounting the second railroad friction-modification assembly onto the opposing rail of the section of railroad track.

10. The railroad friction-modification system of claim 8, wherein the second railroad friction-modification assembly comprises a secondary tube and a secondary nozzle,
wherein the outlet valve of the railroad friction-modification assembly is connected via the secondary tube to the secondary nozzle of the second railroad friction-modification assembly,
wherein a portion of the expelled friction modifier from the outlet valve of the railroad friction-modification assembly is expelled onto the opposing rail of the section of railroad track by the secondary nozzle of the second railroad friction-modification assembly.

11. The railroad friction-modification assembly of claim 1, further comprising
a second nozzle adapted to be installed on an opposing rail of the section of railroad track;
a tube connecting the outlet valve to the second nozzle,
wherein a portion of the expelled friction modifier from the outlet valve of the railroad friction-modification assembly is expelled onto the opposing rail of the section of railroad track by the nozzle of the second railroad friction-modification assembly.

12. A railroad friction-modification assembly for applying a friction modifier to a rail of a section of railroad track, the assembly comprising:
an expandable membrane for storing the friction modifier within the railroad friction-modification assembly;
an inlet valve for receiving the friction modifier from an external storage tank via a tube, wherein the inlet valve is adapted to prevent the friction modifier from flowing back to the external storage tank;
a housing for securely containing the expandable membrane,
wherein the housing is adapted to be installed adjacent to the section of railroad track;
an outlet valve for expelling the friction modifier from the expandable membrane,
wherein the friction modifier is expelled from the expandable membrane by the weight of a railroad car pressing on the expandable membrane; and
a nozzle for directing the expelled friction modifier onto the rail the section of railroad track.

13. The railroad friction-modification assembly of claim 12, wherein the expandable membrane is elongated parallel to the rail such that the expandable membrane receives a portion of a circumference of a wheel of the railroad car.

14. The railroad friction-modification assembly of claim 12, wherein the expandable membrane is adapted to receive the friction modifier from the external storage tank via a pump.

15. The railroad friction-modification assembly of claim 12, wherein the railroad friction-modification assembly is mounted on a field side of the rail of the section of railroad track, such that the nozzle emplaces the friction modifier atop the rail.

16. The railroad friction-modification assembly of claim 12, wherein the nozzle has a substantially Y-shape, such that it expels the friction modifier onto the section of railroad track in two locations.

17. The railroad friction-modification system of claim 12, wherein the housing comprises:
a main body presenting a void,
wherein the expandable membrane is disposed within the void; and
a wear strip secured to the main body,
wherein at least a portion of the wear strip is adapted to rise as the expandable membrane fills with friction modifier,
wherein a wheel of the railroad car will contact the wear strip and apply said weight of the railroad car to the expandable membrane.

18. The railroad friction-modification assembly of claim 17, wherein the housing further comprises:
a flexible sheet secured to the housing between the expandable membrane and the wear strip,
wherein the flexible sheet is adapted to prevent abrasion to and over-inflation of the expandable membrane.

19. A method of modifying the friction of a rail of a section of railroad track, the method comprising the steps of:
installing an external storage tank for storing a friction modifier near the section of railroad track;
installing a mounting assembly adjacent to the rail;
securing a railroad friction-modification assembly to the mounting assembly,
wherein the railroad friction-modification assembly includes—
an expandable membrane for storing the friction modifier;
an inlet valve for receiving the friction modifier from the external storage tank,
wherein the inlet valve is adapted to prevent the friction modifier from flowing back to the external storage tank;
a housing for securely containing the expandable membrane, wherein the housing is adapted to be installed adjacent to the rail of the section of railroad track;

an outlet valve for expelling the friction modifier from the expandable membrane upon the application of a force, wherein at least a portion of said force is provided by the weight of a railroad car upon the section of railroad track;

a nozzle for directing the expelled friction modifier onto the section of railroad track, wherein the railroad friction-modification assembly is positioned such that said force that expels the friction modifier from the expandable membrane can be applied by passing rail cars;

installing a tube connecting the external storage tank to the inlet valve of the railroad friction-modification assembly;

installing a pump to generate a pressure to push the friction modifier through the tube; and filling the external storage tank with the friction modifier.

20. The method of claim 19, wherein the expandable membrane is adapted to expel the friction modifier through the nozzle via a peristaltic action.

\* \* \* \* \*